April 3, 1956
T. R. BILL
2,740,536
TRANSMISSION LINE MAINTENANCE DERRICK
Filed Aug. 23, 1954
2 Sheets-Sheet 1
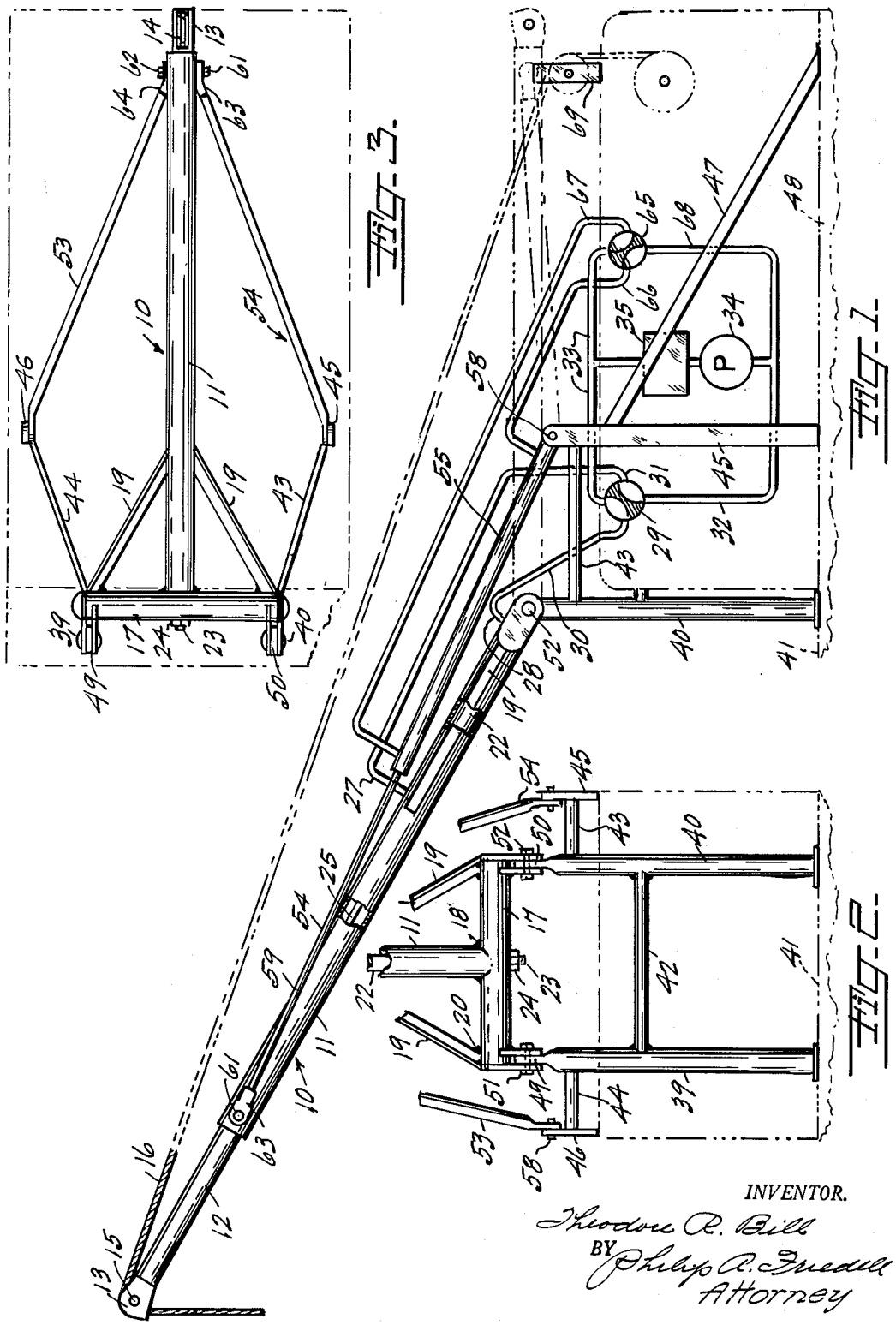
INVENTOR.
Theodore R. Bill
BY Philip A. Freedill
Attorney April 3, 1956        T. R. BILL        2,740,536
TRANSMISSION LINE MAINTENANCE DERRICK
Filed Aug. 23, 1954        2 Sheets-Sheet 2
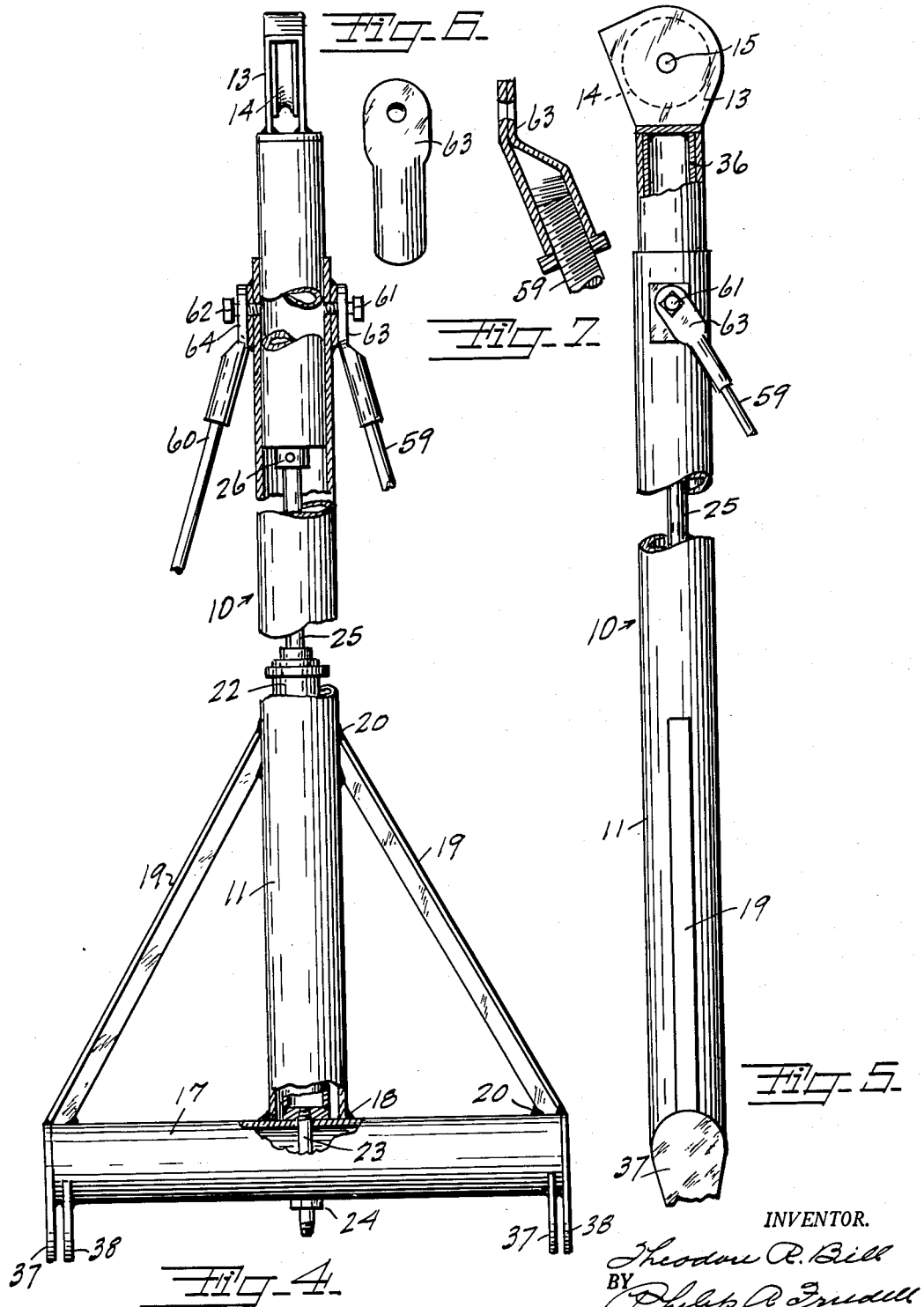
INVENTOR.
Theodore R. Bill
BY
Philip A. Truedell
Attorney

United States Patent Office 2,740,536
Patented Apr. 3, 1956

2,740,536

TRANSMISSION LINE MAINTENANCE DERRICK

Theodore R. Bill, San Leandro, Calif.

Application August 23, 1954, Serial No. 451,556

3 Claims. (Cl. 212—8)

This invention relates to improvement in means for handling transmission line elements and materials and has particular reference to a hoist for setting and removing poles, transformers, cross-arms, and other heavy or cumbersome devices and equipment, and provides a derrick which is peculiarly adapted for mounting on top of a maintenance truck body, though it may readily be mounted on a truck frame or bed for use in other lines, such as the handling of freight or other materials.

The invention is particularly suited for mounting on the roof of a truck because it is completely collapsible, folding substantially flat on top of the roof when not in use, and the body provides an initial elevation which with the boom extension, permits transformers, for example, to be set on or removed from poles up to approximately 30 feet in height without having the collapsed derrick project beyond either end of a normal maintenance truck.

This invention provides the simplest, most efficient, and most convenient and rapid way of setting and removing poles, such as telephone, telegraph, electric transmission, light, and signal poles, since it can be raised ready for operation in less than a minute, and when the operation is completed it can be lowered back on top of the truck so as to offer no obstruction along the road since it collapses completely within the peripheral limits of the truck top, and when collapsed, no portion of the derrick projects much over a foot above the truck top. The derrick is hydraulically raised and lowered, there being a boom extension for increased reach, which also is hydraulically operated, and the sheave on the end of the boom extension will follow the lay of the winch cable as the sheave is mounted in a bracket pivoted coaxially with the boom extension.

This invention is an improvement over my copending application, Serial Number 378,705, filed September 8, 1953, only because of its simplicity in construction with consequent lower manufacturing cost, and its relatively light weight and saving in construction materials and labor.

The objects and advantages of the invention are as follows:

First, to provide a line maintenance truck with a collapsible derrick to lie substantially flat on top of the truck top when not in use, and one which is quickly and easily raised to an operative position to suit the operation to be carried out.

Second, to provide a derrick as outlined which is of the simplest possible construction and of minimum weight consistent with required strength.

Third, to provide a derrick as outlined which is formed of a telescopic structure consisting of two tubes one slidable within the other and having a hydraulic jack cooperating interiorly between the two members for advancing and retracting the said one tube for providing a boom extension for increasing the possible reach of the boom while maintaining the retracted reach within the limits of the truck top.

In describing the invention reference will be had to the accompanying drawings, in which:

Fig. 1 is a side elevation of the invention with the boom extended, and with a truck shown fragmentarily.

Fig. 2 is a rear end elevation of the invention shown fragmentarily.

Fig. 3 is a top plan view of Fig. 1 but showing the boom folded forward on the truck top.

Fig. 4 is an enlarged elevation of the boom and shown partly in section, and portions broken out.

Fig. 5 is a side elevation of Fig. 4 with portions broken out.

Fig. 6 is a side elevation of the adjustable hoisting ram eye connection for the boom.

Fig. 7 is a front elevation of Fig. 6.

The invention includes a boom 10 which is formed of a main tube 11 and an extension tube 12 which is slidable within the main tube. The extension tube terminates in a sheave bracket 13 in which a sheave 14 is rotatably mounted as indicated at 15, for operation of the winch cable 16 thereover.

The lower end of the main tube is welded to a cross tube 17 as indicated at 18, and a pair of struts such as T-bars 19 have their respective ends welded to the sides of the main tube 11 and the outer ends of the cross member 17 as indicated at 20.

A hydraulic motor 21 includes a cylinder 22 the lower end of which is secured to the top of the cross member 17, within the main tube, by a stud 23 which passes diametrically through the crossmember and secured by a nut 24. The plunger 25 of the motor has its terminal end secured to the lower end of the boom extension as indicated at 26, and fluid connections 27 and 28 are provided for the respective ends of the cylinder. Instead of the connection 28, this lower connection may be taken through the stud 22 by substituting pipe or tubing for a solid stud.

The control system for this boom motor is illustrated as consisting of a four-way valve 29 having connections 30 and 31 to the respective lower and upper ends of the cylinder, and connections 32 and 33 respectively to a pump 34 and supply and discharge tank 35.

The sheave bracket is mounted for coaxial movement relative to the boom, either through rotation of the boom extension within the main boom and rotation of the piston and plunger in the cylinder, or may be pivotally mounted for less resistive following of the sheave with the lay of the cable as by a tube 36 which is rotatable in the upper end of the boom extension, with the sheave bracket fixed on the upper end of this tube 36.

The mounting means for the boom consists of depending ears 37 and 38 which pairs of ears span the respective standards 39 and 40 the upper ends of which are flattened, the standards being formed of tubing and supported on the rear end of the truck indicated at 41, and suitable bracing 42 is provided between the standards, and 43 and 44 to the uprights 45 and 46, and additional bracing 47 is provided between the uprights 45 and 46, and the frame 48 of the truck, providing a rigid structure, for suitably supporting the boom, which is pivoted through the ears 37 and 38 to the flattened top portions 49 and 50 of the tubular standards 39 and 40 as indicated at 51 and 52.

There are two boom operating motors, as shown at 53 and 54, the cylinders 55 and 56 of which are pivotally connected to the respective uprights 45 and 46 at a level below the plane of the pivots 51 and 52, and some distance forward as indicated at 58, while the plungers 59 and 60 are connected adjacent the terminal end of the main boom and on the respective sides as indicated at 61 and 62 through adjustable eyes 63 and 64 to compensate for any variations in the extended lengths of the motors to limit the degree of lowering of the boom in operative position as shown in Fig. 1.

Operation of these motors is controlled by suitable means such as the four-way valve 65 which has connections 66 and 67 to the respective lower and upper ends of these cylinders 55 and 56, a connection 33 to the supply and discharge tank 35, and another connection 68 to the pump 34.

A cradle 69 is mounted on the forward portion of the truck top and in which the boom rests when collapsed, at a height in which sufficient purchase is provided by the motors urging from the pivot 58 and which is located in a lower plane to provide the necessary purchase for raising the boom and also lowering it without impact on the cradle.

As will be seen, the invention is of the simplest possible construction, having a minimum number of parts consistent with efficient operation, is easily controlled and operated, and the boom extension is operable at maximum speed while requiring a minimum of fluid for operation.

Obviously, the combination of main boom and boom extension could also function as the motor but would require about five times as much fluid for operation and the extension would operate at about one-fifth the speed, thus also increasing the load on the truck by about five times. Furthermore, with the enclosed motor, no dust or dirt can reach any of the parts of the fluid motor or hydraulic jack within the main boom and which is sealed by the boom extension.

I claim:

1. A transmission line maintenance derrick comprising a cross member hingedly supported at its opposite ends in a plane above the top of the truck, a main boom having its lower end fixed centrally of the length of the cross member, a boom extension telescopic within said main boom and having a sheave rotatably mounted at its upper end, a fluid motor for advancing and retracting said boom extension and comprising a cylinder and a plunger and mounted within said main boom, with the lower end of the cylinder releasably secured to the cross member, and the plunger releasably connected to the lower end of the boom extension for removal and replacement of the fluid motor at will, said cylinder having an internal cross sectional area equal to substantially one fifth of the internal cross sectional area of the main boom for rapid advance and retraction of the boom extension through transfer of a minimum volume of fluid, and a supply of fluid under pressure and having connection to both ends of the cylinder for operation in both directions and including control means therefor.

2. An extensible boom comprising a cross member, a main tube fixed to said cross member, an extension tube slidable in said main tube, a fluid motor including a cylinder and a plunger and housed within said main tube and cooperating between said cross member and said extension tube and including a source of fluid under pressure and control means therefor including a communicating connection for the upper end of said cylinder and passing through the wall of the main tube, and combined securing means and communicating connection for the lower end of the cylinder and comprising a tubular stud secured to and communicating through the lower end of the cylinder and passing through said cross member and terminating in a connection for said source of fluid under pressure, and a nut for said stud.

3. A truck having a frame and a body having a top and a front end and a rear end with the frame projecting beyond the rear end of the body, a pair of standards mounted on the projecting portion of the frame and spaced to provide a passage for entrance to the rear of the body, with the standards extending above the plane of the top and each terminating in an eye, a cross member having depending ears at each end to span the eyes and pivoted thereto, a telescopic boom including a main boom and an extension boom slidable in said main boom, the lower end of said main boom being fixed to said cross member, a strut for each side of the main boom and having the respective ends fixed to the respective ends of the cross member and to the respective sides of the boom adjacent the lower end to provide rigidity, a pair of bearings mounted on the respective sides of the top and located forwardly of said eyes, a boom operating fluid motor for each side of the main boom and having connection between the respective sides of the upper end of the main boom and the respective bearings for operating said boom for advance and retraction between a reclined position on top of said truck and to a position overhanging the rear of the truck, a boom extension operating fluid motor housed within said main boom and having the lower end of its cylinder fixed to said cross member and its plunger fixed to the lower end of said boom extension, a source of fluid under pressure for said fluid motors and including manual control means therefor, and a sheave and a support therefor with the support rotatably mounted in the upper end of the boom extension for coaxial rotation.

References Cited in the file of this patent

UNITED STATES PATENTS

| | | |
|---|---|---|
| 2,196,649 | Waite | Apr. 9, 1940 |
| 2,348,899 | Guignard et al. | May 16, 1944 |
| 2,475,963 | Howell | July 12, 1949 |
| 2,557,466 | Richards et al. | June 19, 1951 |
| 2,684,159 | Oldenkamp | July 20, 1954 |
| 2,687,811 | Hurst | Aug. 31, 1954 |

FOREIGN PATENTS

| | | |
|---|---|---|
| 1,068,713 | France | Feb. 10, 1954 |